United States Patent [19]
Tsuchiya et al.

[11] Patent Number: 5,856,965
[45] Date of Patent: Jan. 5, 1999

[54] OPTICAL DISC READOUT APPARATUS FOR DIFFERENT TYPES OF OPTICAL DISCS

[75] Inventors: Yoichi Tsuchiya, Hashima; Seiji Kajiyama, Gifu; Yasuyuki Kanou, Hashima, all of Japan

[73] Assignee: Sanyo Electric Co., Ltd., Osaka, Japan

[21] Appl. No.: 646,063

[22] Filed: May 7, 1996

[30] Foreign Application Priority Data

| May 8, 1995 | [JP] | Japan | 7-134805 |
| May 30, 1995 | [JP] | Japan | 7-156896 |
| May 16, 1995 | [JP] | Japan | 7-141169 |
| Apr. 22, 1996 | [JP] | Japan | 8-126453 |

[51] Int. Cl.$^6$ ........................ G11B 7/00
[52] U.S. Cl. ................ 369/58; 369/110; 369/112; 369/121
[58] Field of Search ............... 369/44.37, 44.38, 369/110, 13, 100, 121, 108, 112, 44.23, 124, 44.29, 44.27, 58, 94, 54

[56] References Cited

U.S. PATENT DOCUMENTS

| 5,281,797 | 1/1994 | Kimio . | |
| 5,408,453 | 4/1995 | Holtslag et al. | 369/44.37 |
| 5,416,757 | 5/1995 | Luecke et al. | 369/44.23 |
| 5,446,565 | 8/1995 | Komma et al. | 369/112 |
| 5,526,336 | 6/1996 | Park et al. | 369/44.37 |
| 5,615,200 | 3/1997 | Hoshino et al. . | |
| 5,621,717 | 4/1997 | Finkelstein et al. | 369/94 |
| 5,627,814 | 5/1997 | Lee | 369/44.37 |

FOREIGN PATENT DOCUMENTS

| 0610055 | 8/1994 | European Pat. Off. . |
| 0725395 | 8/1996 | European Pat. Off. . |
| 0731457 | 9/1996 | European Pat. Off. . |
| 0737964 | 10/1996 | European Pat. Off. . |
| 0762398 | 3/1997 | European Pat. Off. . |
| 0762403 | 3/1997 | European Pat. Off. . |
| 0766236 | 4/1997 | European Pat. Off. . |
| 5120720 | 5/1993 | Japan . |
| 5303766 | 11/1993 | Japan . |
| 6124477 | 5/1994 | Japan . |
| 844105 | 2/1996 | Japan . |

*Primary Examiner*—Thang V. Tran
*Attorney, Agent, or Firm*—Loeb & Loeb LLP

[57] ABSTRACT

An optical disc readout apparatus having an optical system which guides a laser beam onto a signal recording surface of a loaded disc through an objective lens and guides a reflected laser beam onto a photo detector. An effective numerical aperture of the objective lens is adjusted according to the thickness between a substrate surface of the loaded disc and the signal recording surface, and the laser spot with a diameter suitable to a recording density of the loaded disc is focused on the signal recording surface. Therefore, the data recorded in a plurality of optical discs with different thickness or recording densities can be read out.

15 Claims, 6 Drawing Sheets

Reading a 1.2mm HDMCD →E1, L1 •

Reading a 0.6mm SD →E2&E1, L2&L1 ⟷ & ⇠⇢
or E2, L2 ⟷

OPTICAL DISC READOUT APPARATUS FOR DIFFERENT TYPES OF OPTICAL DISCS

FIELD OF THE INVENTION:

The present invention generally relates to an optical disc readout apparatus, and more particularly to an optical disc readout system which can read information from both an optical disc with a thick substrate and an optical disc with a thin substrate. The optical disc with a thick substrate refers to an optical disc of a thickness of approximately 1.2 mm, for example; and the optical disc with a thin substrate refers to an optical disc of a thickness of approximately 0.6 mm, for example. The thickness of the substrate is defined in this specification as a distance from the surface of the substrate to the information-bearing surface. Accordingly, an optical disc of approximately 1.2 mm is composed of two optical discs of approximately 0.6 mm thickness, adhered to each other back to back, is also referred to as an optical disc of approximately 0.6 mm in this specification.

BACKGROUND OF THE INVENTION:

As a readout type optical disc for recording multimedia data, CD-ROM, etc., have been put to practical use. A CD-ROM is a medium having a diameter of 12 cm, a thickness of 1.2 mm, a track pitch of 1.6 $\mu$m and a recording capacity of 540 Mbytes on one side. A digital video disc (DVD) which can record video data by utilizing compression technologies, such as MPEG (Moving Picture Experts Group) type compression technology, is under development. However, when video data in the MPEG-2 standard is to be recorded onto a current CD-ROM at a data transfer rate of 4 Mbps, only approximately 20 minutes of video data can be recorded. This means that the current CD-ROM medium is insufficient for recording a movie of about 120 minutes.

To solve this problem, technology for increasing recording density to several times that of current optical discs is under development. In this specification, the recording density equivalent to that of the CD-ROM is referred to as "standard density."

For example, an SD (Super Density) with a diameter of 12 cm (i.e., the same diameter as that of the CD-ROM), which can record approximately 5 Gbytes of data on one side, has been proposed. The SD has a track pitch of approximately 0.73 $\mu$m, a shortest pit length of approximately 0.4 $\mu$m, and employs an efficient modulation mode. The thickness of the SD is 0.6 mm. When two SDs are adhered together, back to back, the combined piece can record as much as approximately 10 Gbytes of data, which is equivalent to 240 minutes of movie data.

An HDMCD (High Density Multimedia Compact Disc) with a diameter of 12 cm (i.e., the same diameter as that of the CD-ROM), which can record approximately 3.7 Gbytes of data on one side, has been proposed. The HDMCD has a track pitch of approximately 0.84 $\mu$m and a shortest pit length of approximately 0.45 $\mu$m. The thickness of the HDMCD is 0.6 mm.

Art relating to embodiments of the present invention has been disclosed in Japanese Unexamined Patent Publication No. 7-57271.

In Japanese Unexamined Patent Publication No. 6-215406, an optical pickup is disclosed which can focus the respective beam spots upon the respective information-bearing surfaces of two different types of optical discs having different substrate thicknesses.

In Japanese Unexamined Patent Publication No. 5-303766, an optical pickup is disclosed which corrects the coma effect caused by the difference in substrate thickness of the optical discs without changing the focal length by advancing an aspherical optical element having no refracting power into a collimated light beam or withdrawing the optical element therefrom according to the thickness of the loaded optical disc. In this arrangement, the pickup can focus the respective beam spots upon the respective information-bearing surfaces of the respective optical discs having different substrate thicknesses.

In Japanese Unexamined Patent Publication No. 6-259804, an apparatus is disclosed which is equipped with a laser diode for reproducing the standard density CD with a thick substrate and a laser diode for recording and reproducing the high density optical disc with a thin substrate and can focus the laser beam output from the laser diode selected according to the optical disc upon the information-bearing surface through a common optical system.

In order to read information from the high density optical disc, the spot diameter of the laser beam focused upon the information-bearing surface must be reduced to approximately 0.9 $\mu$m. In order to reduce the spot diameter to such extent, the wavelength of the laser beam must be shortened or the numerical aperture NA of the objective lens must be increased. However, if the numerical aperture NA of the objective lens is increased, the coma increases in proportion to the third power of the numerical aperture NA of the objective lens. For this reason, if the laser beam which falls upon the substrate surface of the optical disc inclines to the normal substrate surface, the coma increases and consequently the reproduced signals are degraded. Inclination of the optical disc, which makes it not possible for the laser beam to perpendicularly fall upon the substrate surface, is sometimes caused by warping of the optical disc or the like. On the other hand, as the coma is also proportional to the thickness of the optical disc substrate, it is possible to control the coma due to the inclination of the optical disc substrate by reducing the thickness of the optical disc substrate. Based on this principle, to reduce the spot diameter of the laser beam to approximately 0.9 $\mu$m by increasing the numerical aperture NA of the objective lens while controlling the coma due to the inclination of the optical disc substrate, a means for reducing the thickness of the optical disc substrate has been examined.

The objective lens of the optical pickup is designed considering the thickness of the optical disc and the wavelength of the laser beam. Therefore, if the substrate thickness of the optical disc on which information is recorded or from which information is read is different from the substrate thickness supposed to be in the objective lens design process, wave aberration results. As a result, the laser beam fails to focus upon the information-bearing surface of the optical disc, and information recording or information reproducing to or from the optical disc is not possible. For example, when an optical pickup mounted with an objective lens designed for an optical disc of 0.6 mm in substrate thickness is used, it is not possible to focus the laser beam upon the information-bearing surface of an optical disc of 1.2 mm in substrate thickness, and therefore, it is not possible to record the information on or read the information recorded on the optical disc of 1.2 mm thickness. This means, for two different types of optical discs with different substrate thicknesses, an optical pickup mounted with two objective lens suitable to the respective different types of optical discs must be prepared.

SUMMARY OF THE INVENTION:

It is presumed that a disc type of standard density with a thickness of 1.2 mm (CD, CDROM), a disc type of high density with a thickness of 1.2 mm (HDMCD), and a disc type of high density with a thickness of 0.6 mm (SD) will continue to exist.

It is an object of embodiments of the present invention to provide an apparatus which can record data on optical discs, each being one of two or more different thicknesses and to provide an apparatus which can read out data from optical discs having one of two or more different thicknesses.

An optical disc readout apparatus irradiates a laser beam onto the signal recording surface of an optical disc through an objective lens and guides the laser beam reflected from the signal recording surface into a photodetector, and thereby reads out the signal. The object of embodiments of the present invention is fulfilled by constructing such optical disc readout apparatus comprising a means for adjusting the effective numerical aperture of the objective lens through the adjustment of the optical system, and guiding the laser beam output from the laser source into the objective lens according to the thickness of the optical disc.

In this construction, when the effective numerical aperture of the objective lens has been adjusted according to the thickness of the substrate of the loaded optical disc, the laser spot with a diameter suitable to the recording density of the loaded optical disc is focused on the signal recording surface of the loaded optical disc.

The adjustment described above can be realized by, for example, interposing a stopping down means within the beam path between the laser source and the objective lens.

The adjustment described above can also be realized by, for example, constructing the optical disc readout apparatus so that two different types of laser sources having mutually orthogonal directions of polarization are switched from one to the other in operation, and a polarization selection means which stops down the diameter of the beam path for one polarization but does not stop down for the other polarization. In this construction, the laser sources are switched from one to the other according to whether an optical disc with the standard thickness is loaded or an optical disc with a thinner thickness is loaded. The standard thickness is a thickness ranging, for example, from 1.15 mm to 1.25 mm, and the thinner thickness is a thickness ranging, for example, from 0.55 mm to 0.65 mm.

The adjustment described above can also be realized by, for example, selectively reading out either the reflected beam of the one polarized beam with the beam diameter thereof stopped down or the reflected beam of the other polarized beam transmitted with the beam diameter thereof not stopped down. This can specifically be constructed by, for example, providing the first photodetector which detects the reflected beam of the one polarized beam with the beam diameter thereof stopped down and the second photodetector which detects the reflected beam of the other polarized beam transmitted with the beam diameter thereof not stopped down, and sending the detection signal of either photodetector to the readout signal processing part.

The object of embodiments of the present invention is also fulfilled by, for example, adjusting the degree of amplification of the high frequency component of the readout signal or the degree of gain of the readout signal according to the thickness of the loaded optical disc.

The object of embodiments of the present invention is also fulfilled by, for example, using an objective lens so designed that the inner circumferential part is longer in focal length than the outer circumferential part, and adjusting the effective numerical aperture of such objective lens so that the laser spot can be focused onto the signal recording surfaces of the respective optical discs of different types with different thicknesses. For example, when an optical disc of the standard thickness is loaded, the laser beam that has passed through the inner circumferential part of the objective lens is focused onto the signal recording surface; and when an optical disc of the thinner thickness is loaded, the laser beam that has passed through the outer circumferential part of the objective lens is focused onto the signal recording surface. In the latter case, if the inner circumferential part of the objective is shaded, the laser spot is further stopped down due to an optical super-resolution phenomenon.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS:

A detailed description of embodiments of the invention will be made with reference to the accompanying drawings,. wherein like numerals designate corresponding parts in the several figures.

Figures 1A, 1B:
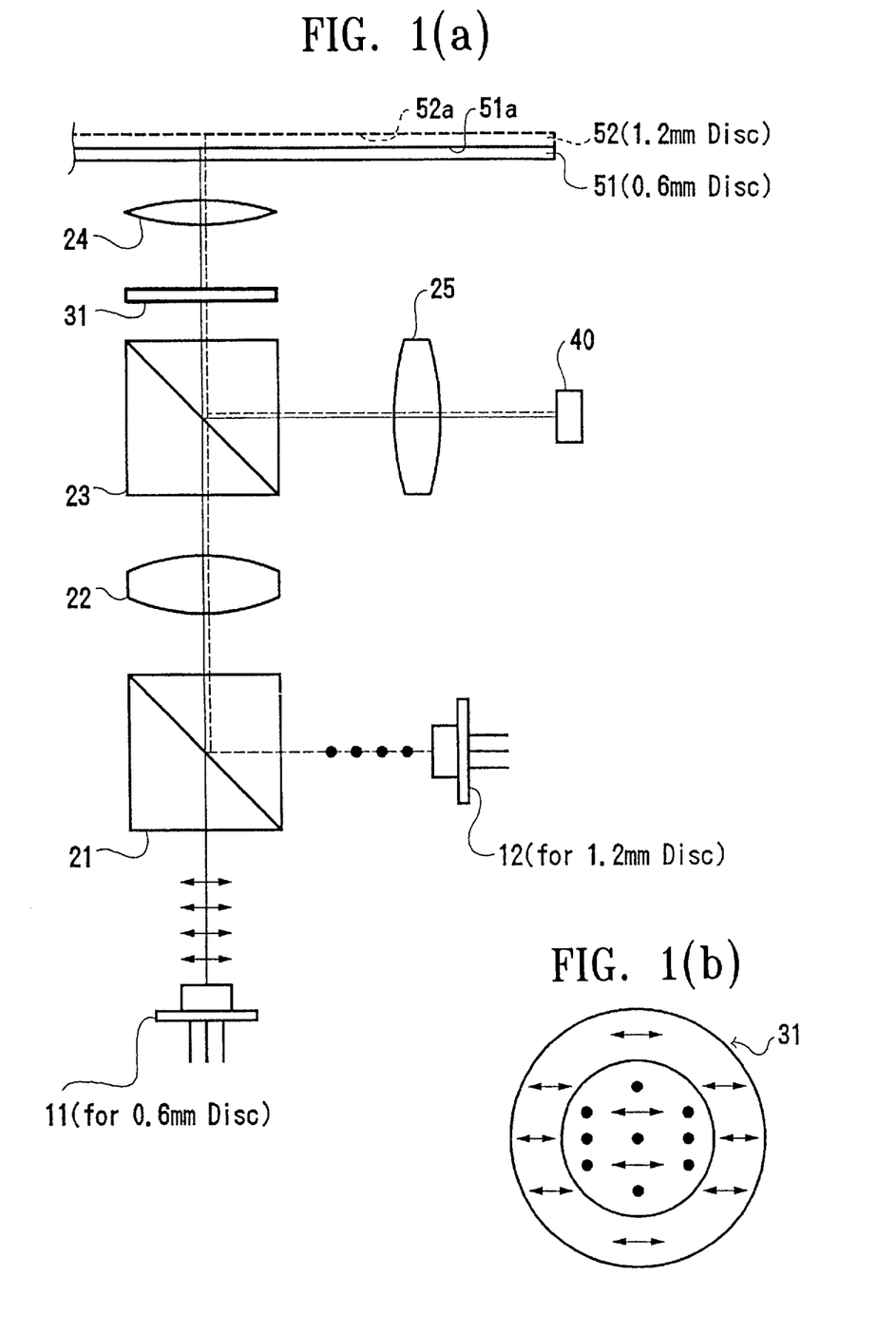
FIG. 1(a) is a schematic illustrating the optical system according to a first embodiment of the present invention.
FIG. 1(b) is a descriptive view of a paralyzation selection filter for use in the first embodiment.

DETAILED DESCRIPTION OF THE PREFERRED EMBODIMENT:

FIG. 1(a) illustrates a first embodiment according to the present invention. In this figure, a semiconductor laser 11 and a semiconductor laser 12 output laser beams with the directions of polarization orthogonal to each other. The thin full line indicates the laser beam from the semiconductor laser 11, and the thin broken line indicates the laser beam from the semiconductor laser 12. The semiconductor laser 11 is mounted for an optical disc 51 with a thickness of 0.6 mm, and is designed to output a laser beam with a wavelength of 635±15 nm (or 650±15 nm). Here, ±15 nm is a tolerance. The semiconductor laser 12 is mounted for an optical disc 52 with a thickness of 1.2 mm, and is designed to output a laser beam with a wavelength of 635±15 nm (or 650±15 nm). The optical disc 51 with a thickness of 0.6 mm is a high-density SD, and the optical disc 52 with a thickness of 1.2 mm is a high-density HDMCD or a standard density CD. The numerical aperture of an objective lens 24 is designed to be 0.6 for the optical disc 51 with a thickness of 0.6 mm.

When the optical disc 51 with a thickness of 0.6 mm is loaded, the semiconductor laser 11 is turned ON, and the semiconductor laser 12 is turned OFF. The laser beam with a wavelength of 635 nm (P polarized beam) output from the semiconductor laser 11 is passed through a polarized beam splitter 21, refracted by a collimator lens 22 to form a collimated beam, passed through a half mirror 23, passed through a polarizing filter 31 without being stopped down, and condensed by the objective lens 24 to focus onto the signal recording surface 51a of the optical disc 51 with a thickness of 0.6 mm. The diameter of the laser spot at this point is approximately 0.9 m.

The laser light reflected by the signal recording surface 51a is refracted by the objective lens 24 to form a collimated beam, passed through the polarizing filter 31 without being stopped down, reflected and bent 90° by the half mirror 23, condensed by a condenser lens 25 to be focused onto a photodetector 40, and detected as a signal corresponding to the recording data.

When the optical disc 52 with a thickness of 1.2 mm is loaded, the semiconductor laser 12 is turned ON, and the semiconductor laser 11 is turned OFF. The laser beam with a wavelength of 635 nm output from the semiconductor laser 12 (S polarized beam) is reflected by the polarized beam splitter 21, collimated by the collimator lens 22, passed through the half mirror 23, cut off at the circumferential part by the polarizing filter 31, passed through the center part thereof (stopped down by the polarizing filter 31), and condensed by the objective 24 to be focused onto the signal recording surface 52a of the optical disc 52 with a thickness of 1.2 mm. The diameter of the laser spot at this point is approximately 1.3 $\mu$m. That is, by being stopped down by the polarizing filter 31, the effective numerical aperture of the objective lens 24 is approximately 0.4.

The polarizing filter 31 is a polarization selection filter which allows the P polarized beam to pass therethrough without being stopped down (double headed arrows in FIG. 1 (b)), but allows the S polarized beam to be stopped down to a smaller diameter (black dots in FIG. 1 (b)). When the numerical aperture of the objective lens 24 is 0.6 and the focal length f thereof is 3.3 mm, and when the effective diameter of the laser beam (the diameter of the outer circle in FIG. 1(b) is 3.96 mm, the diameter equivalent to a numerical aperture of 0.4 after being stopped down by the polarizing filter 31 (the diameter of the inner circle in FIG. 1 (b)) is 2.64 mm.

The laser beam reflected by the signal recording surface 52a is collimated by the objective lens 24, passed through the polarizing filter 31 without being stopped down (for the reason that the laser beam have already been stopped down), reflected and bent 90° by the half mirror 23, condensed by a condenser lens 25 to focus onto a photodetector 40, and detected as a signal corresponding to the recording data thereby.

In the construction described above, the polarizing filter 31 is used. Instead of the polarizing filter 31, however, a polarization selection hologram may be used. The polarization selection hologram is an optical element for allowing only the center part of one polarized beam to pass therethrough by diffusing the circumferential part.

Also in the construction described above, by disposing the polarizing filter 31 immediately before the objective lens 24 so that both the objective lens 24 and the polarizing filter 31 can integrally shift even during tracking servo control to achieve good condensation or readout characteristics. However, if some degradation is allowable in the readout characteristics, the polarizing filter 31 may be provided as a fixed aperture. In this case, the polarizing filter 31 may be disposed in any position between the semiconductor laser 12 and the objective lens 24. Furthermore, if the polarizing filter 31 is provided such that a part of the filter is off the beam path of the semiconductor laser 11 (i.e., between the semiconductor laser 12 and the polarized beam splitter 21), an ordinary stop may be used instead of the polarizing filter.

Figure 2:
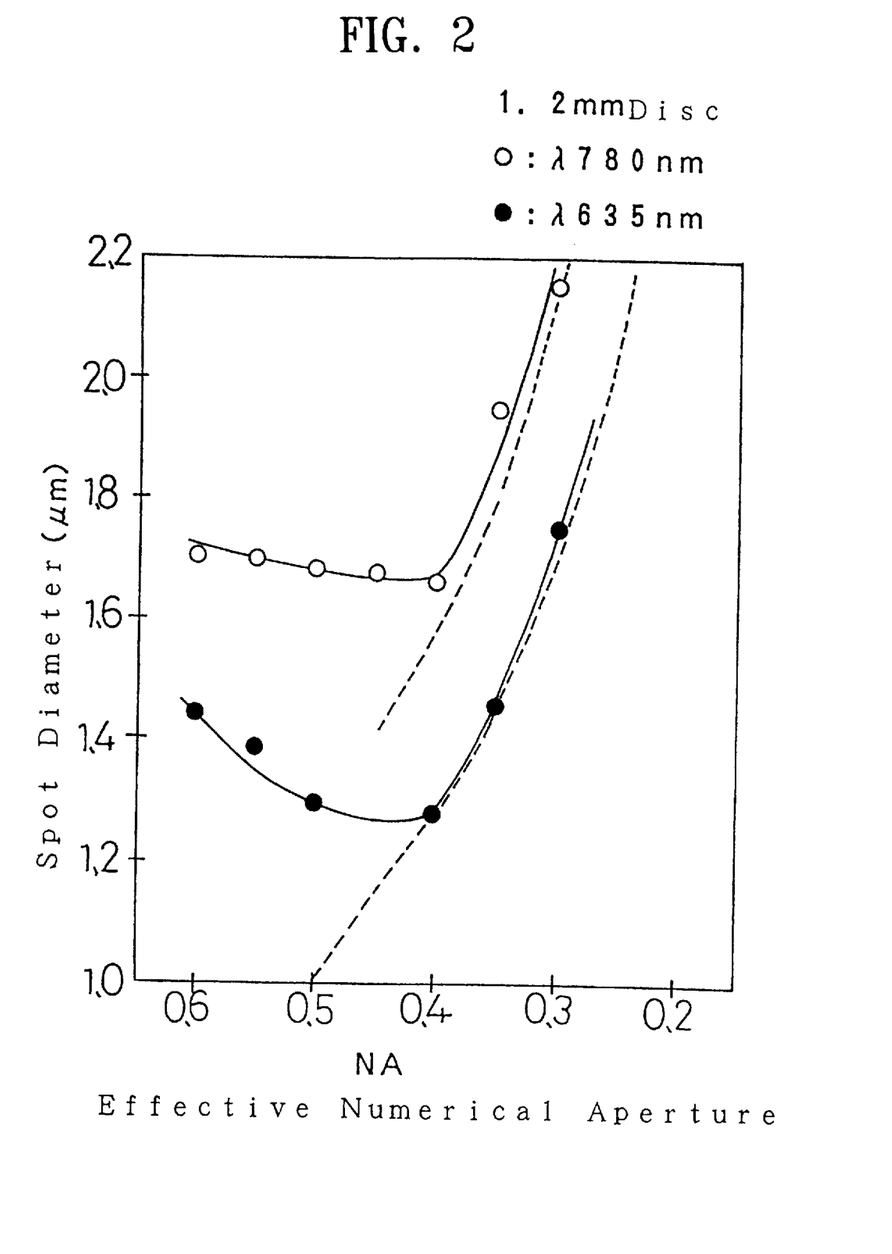
FIG. 2 is a graph showing the relationship between the spot diameter and the effective numerical aperture when an objective lens with a numerical aperture of 0.6 adjusted to an SD with a thickness of 0.6 mm is used, the effective numerical aperture is adjusted by inserting a diaphragm into the beam path, and the laser beam is condensed to a signal recording surface of a disc with a thickness of 1.2 mm.

Referring to FIG. 2, the following describes the relationship between the effective numerical aperture (NA) and the laser spot diameter. FIG. 2 illustrates the relationship between the effective NA and the laser spot diameter where a laser beam was condensed onto a signal recording surface of an optical disc of 1.2 mm thickness by using an objective lens of NA 0.6 which is designed for a 0.6 mm thick disc, and an aperture was set within the beam path and the effective NA was varied by adjusting the aperture. Here, the black dots indicate a case where a laser beam wavelength of 635 nm is used, and the open dots indicate a case where a laser beam wavelength 780 nm is used.

In an area where the effective NA is smaller than 0.4, the laser spot diameter is roughly proportional to $\lambda$/NA. However, in an area where the NA is larger than 0.4, a phenomenon occurs when an optical disc having a thickness different from the regular thickness is read out, the spherical aberration increases in proportion to the fourth power of the numerical aperture is effective, and thus the larger the numerical aperture, the harder the stopping down of the laser spot diameter. Here, the regular thickness is a thickness which is designed to match a mounted objective lens.

For this reason, as illustrated in FIG. 2, when the effective numerical aperture is around 0.4 (0.35 –0.4), the laser spot diameter is the smallest (1.3 $\mu$m for a laser beam of 635 nm, and 1.65 for a laser beam of 780 nm). According to embodiments of the present invention, it is possible to read out the optical disc of 1.2 mm thickness by using an objective lens designed for the optical disc having a thickness of 0.6 mm. In other words, it is possible to interchange the standard density CD of 1.2 mm and the high-density SD of 0.6 mm. Wavelengths of 635 ±15 nm, 650±15 nm, 680±15 nm or 780±nm may be used. Incidentally, in further embodiments the semiconductor laser 11 and the semiconductor laser 12 may be of different wavelengths.

As described above, when a laser beam with a wavelength of 635 nm is used, it is possible to focus the laser spot of 1.3 $\mu$m in diameter onto the signal recording surface of the optical disc having a thickness of 1.2 mm by using the objective lens designed for the optical disc of 0.6 mm. On the other hand, when a laser beam with a wavelength of 780 nm is used, it is possible to focus the laser spot of 1.65 $\mu$m in diameter on the signal recording surface of the optical disc of 1.2 mm by using the objective designed for the optical disc having a thickness of 0.6 mm.

In the currently used standard density CD of 1.2 mm thickness, readout is possible with a laser spot of 1.6 $\mu$m diameter, and a readout is also possible by stopping down the laser beam with a wavelength ranging from 620 nm to 800 nm to a range from 1.3 $\mu$m to 1.65 $\mu$m as described above. However, in reading out the high-density 1.2 mm HDMCD, a laser spot diameter of around 1.1 $\mu$m is required, and the construction described above cannot achieve good readout characteristics.

Figure 5A:
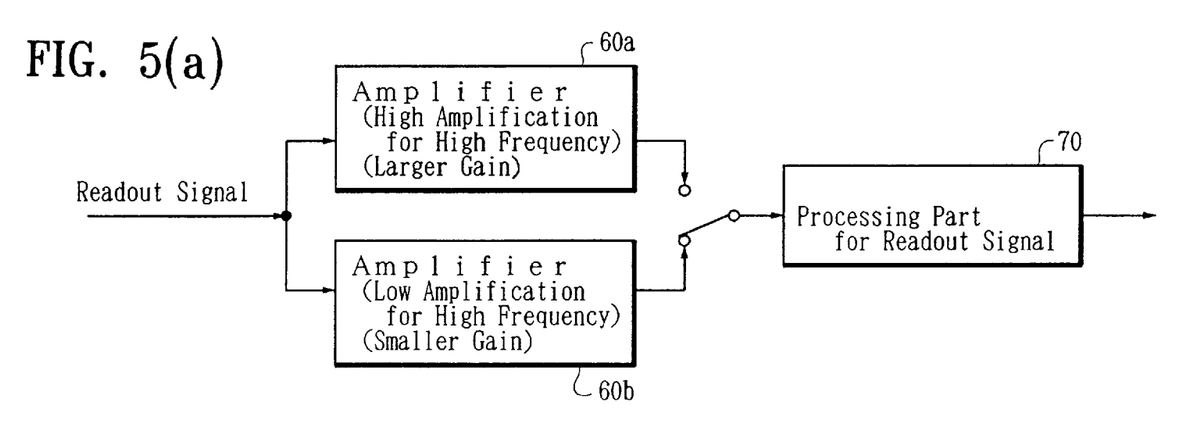
FIGS. 5(a) and (b) are block diagrams illustrating a signal processing part for use when a HDMSC and an SD are made compatible with each other.
Figure 5B:
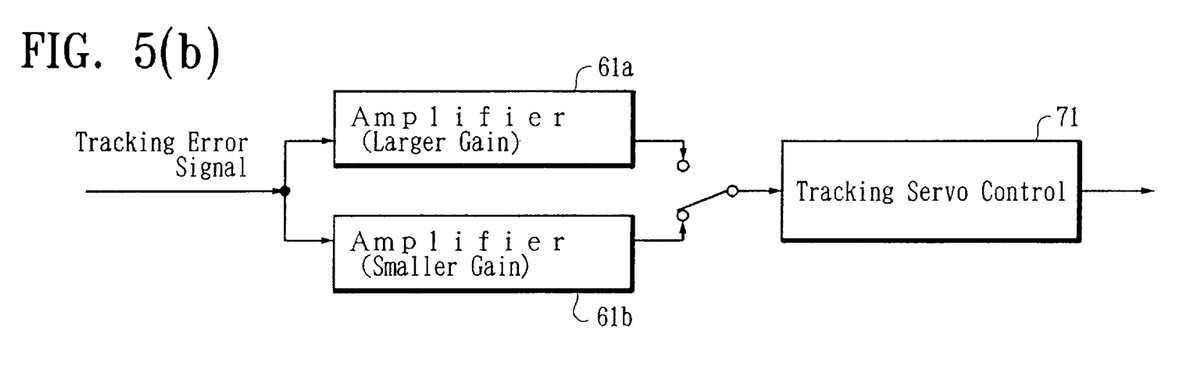

Therefore, for interchanging the high-density 1.2 mm HDMCD with the SD of 0.6, such circuitry as illustrated in FIG. 5 is employed. Specifically, in reading out the HDMCD, an amplifier 60a is selected, and the degree of gain of the readout signal and the degree of amplification of high frequency components are increased over those for the SD, and this data is sent to a readout signal processing part 70. Also, an amplifier 61a is selected, the degree of gain of the tracking error signal is increased from that of the SD, and this data is sent to a tracking servo controller 71. Conversely, in reading out the SD, an amplifier 60b is selected, and the degree of gain of the readout signal and the degree of amplification of high frequency components are decreased from those of the HDMCD, and this data is sent to a readout signal processing part 70. Also, an amplifier 61a is selected, the degree of gain of the tracking error signal is decreased from that of the HDMCD, and this data is sent to a tracking servo controller 71. By forming the circuit as described above, one can compensate for a readout signal having frequent jitter and excessive noise. Incidentally, this construction utilizes a wavelength ranging from 620 nm to 665 nm.

According to the second embodiment (see FIG. 3), a photodetector 41 for detecting the reflected beam of the laser beam output from the semiconductor laser 11 and a photodetector 42 for detecting the reflected beam of the laser beam output from the semiconductor laser 12 are used. For this arrangement, a polarized beam splitter 26 is disposed ahead of the photodetectors 41 and 42 so that the reflected beam of the laser beam output from the semiconductor laser 11 is condensed onto the photodetector 41, and the laser beam output from the semiconductor laser 12 is condensed onto the photodetector 42. As two photodetectors are used in this way, it is no longer necessary that the photodetector be positioned with respect to the first semiconductor laser (the semiconductor laser 11 or the semiconductor laser 12) and then the second semiconductor laser (the semiconductor laser 12 or the semiconductor laser 11) be positioned with respect to the photodetector.

Figure 3:
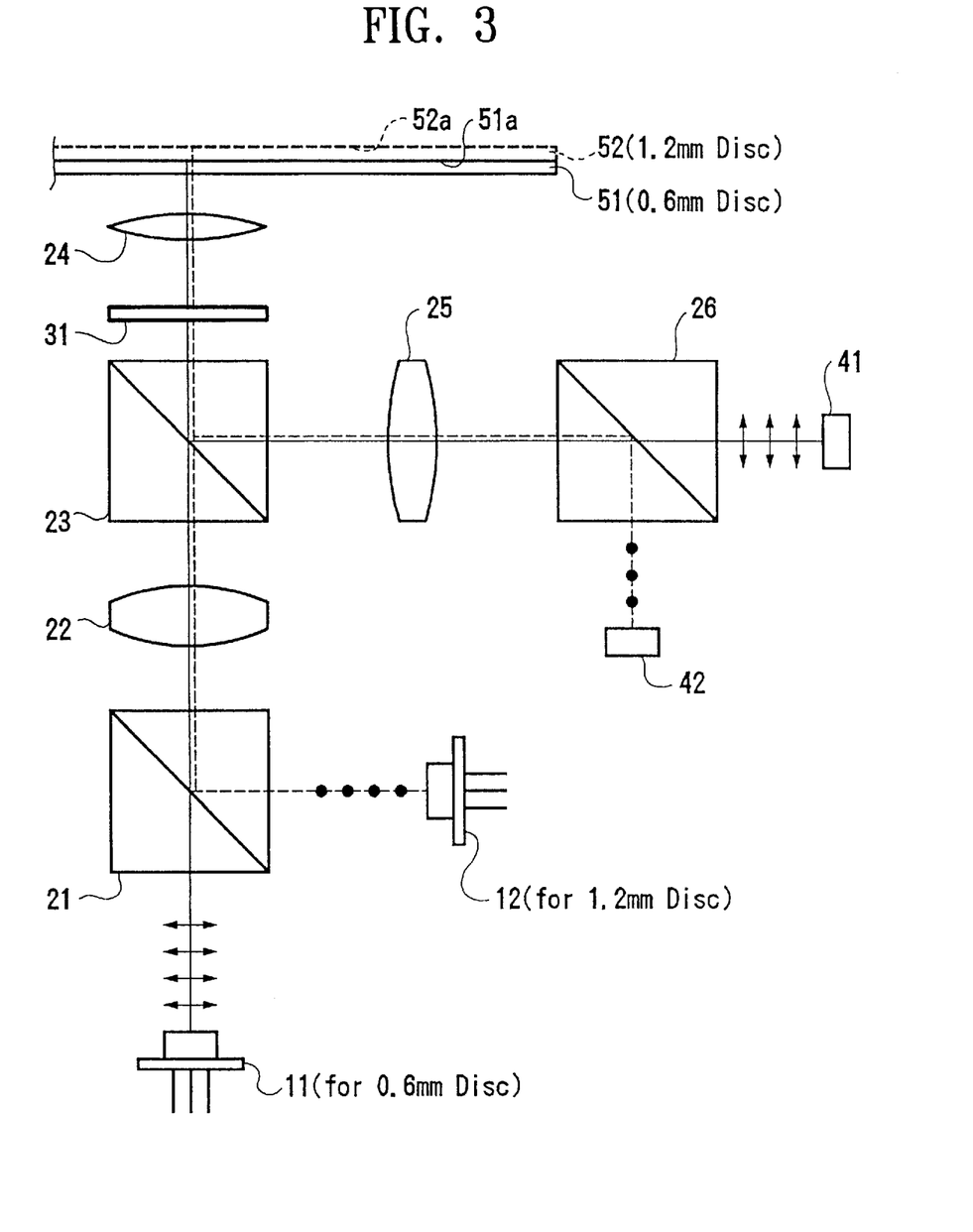
FIG. 3 is a schematic illustrating the optical system according to a second embodiment of the present invention.

As the other parts of the construction of the second embodiment are the same as those of the first embodiment, the same parts are referred to by the same reference numerals, and the description thereof will be omitted.

According to the third embodiment (see FIG. 4), a one-chip semiconductor laser 10 is used. The semiconductor laser 10 is composed of two separate semiconductor lasers, which can output laser beams of TE mode and TM mode, respectively, with the directions of polarization orthogonal to each other, mounted on one chip. The laser wavelength is 635 nm. Since one chip having lasers with TE mode and TM mode is used, and the laser beam of either TE mode or TM mode is selected according to whether the 0.6 mm optical disc or 1.2 mm optical disc is loaded, the polarized beam splitter 21 illustrated in FIGS. 1 and 3 is no longer necessary.

Figure 4:
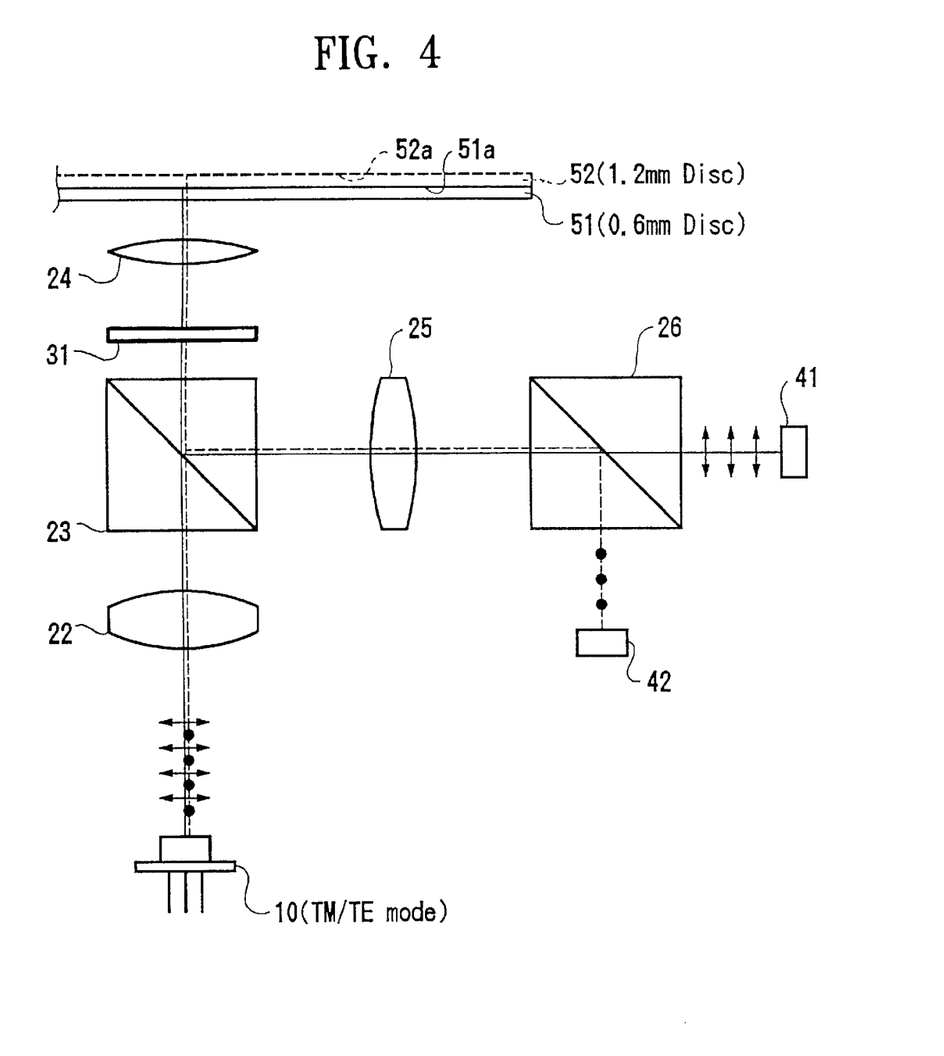
FIG. 4 is a schematic illustrating the optical system according to a third embodiment of the present invention.

As the other parts of the construction of the third embodiment are the same as those of the first and second embodiments, the same parts are referred to by the same reference numerals, and the description thereof will be omitted.

Figure 6A:
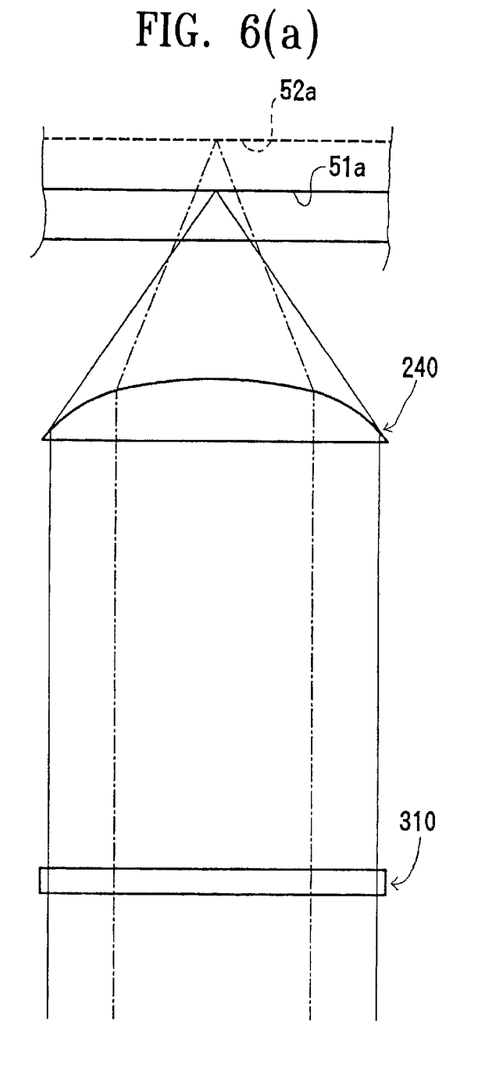
FIGS. 6(a)–(c) illustrate a portion of an optical system according to a fourth embodiment of the present invention.
Figure 6B:
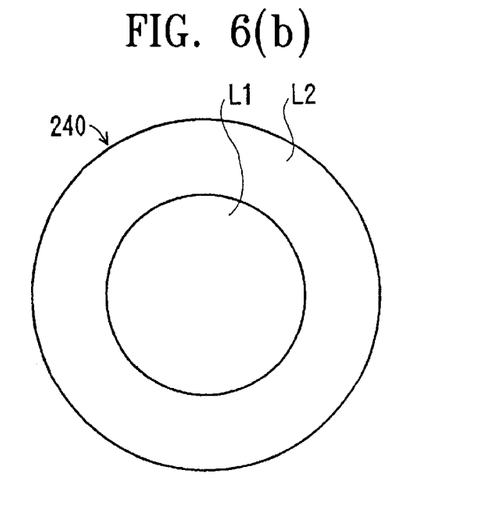
Figure 6C:
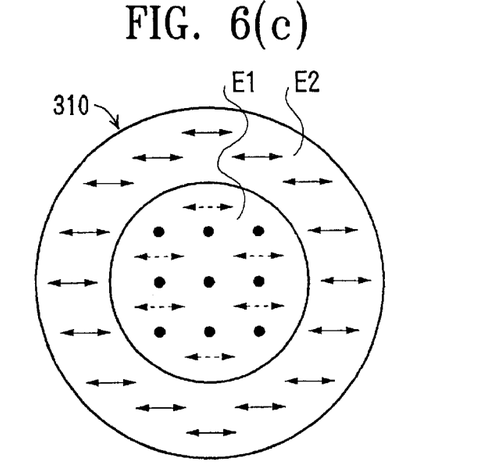

According to the fourth embodiment (see FIG. 6), the objective lens 24 and polarizing filter 31 of the first through third embodiments are replaced by an objective lens 240 and a polarizing filter 310, respectively. As the other parts of the construction of the fourth embodiment are the same as those of the first through third embodiments, the illustration of the entire optical system will be omitted, and the objective lens 240 and the polarizing filter 310 will be described.

The objective lens 240 is designed by changing the focal length between the inner circumferential part and the outer circumferential part. Specifically, the objective lens 240 is designed with different curvatures between the inner circumferential part and the outer circumferential part so that the laser beam passing through the inner circumferential part of the objective lens 240 can focus on the signal recording surface 52a of the optical disc of 1.2 mm, as indicated by the chain line with one dot in FIG. 6(a); and the laser beam passing through the outer circumferential part of the objective lens 240 can focus on the signal recording surface 51a of the optical disc of 0.6 mm, as indicated by the thin full line in FIG. 6(a).

The polarizing filter 310 is a filter for shading only the outer circumferential part of the S polarized beam, in the same way as the polarizing filter 31 described above does. That is, the polarizing filter 310 allows both the outer circumferential part and inner circumferential part of the P polarized beam to transmit therethrough, as indicated by the directional thin lines with arrows at both ends and directional broken lines with arrows at both ends in FIG. 6(c), and allows only the inner circumferential part of the S polarized beam to transmit therethrough, as indicated by the black dots in FIG. 6(c).

In reading out the 1.2 mm thick HDMCD, the S polarized beam indicated by the black dots is output from the laser source, and the outer circumferential part thereof is shaded by the polarizing filter 310, and the inner circumferential part thereof is transmitted therethrough. As indicated by the chain line with one dot in FIG. 6(a), this S polarized beam is focused onto the signal recording surface 52a of the 1.2 mm thick HDMCD, by the inner circumferential part of the objective lens 240, and thus the data is read out from the HDMCD.

In reading out the 0.6 mm thick SD, the P polarized beam is output from the laser source, as indicated by the directional thin full lines with arrows at both ends and the directional broken lines with arrows at both ends in FIG. 6(c). The P polarized beam is not shaded by the polarizing filter 310, and both the outer circumferential part and inner circumferential part thereof are condensed by the objective lens 240. Among all of the laser beam parts, the laser beam part passing through the outer circumferential part of the objective lens 240 is focused onto the signal recording surface 51a of the SD of 0.6 mm, as indicated by the directional thin full lines in FIG. 6(a), and thereby the data is read out from the SD. Here, the laser beam part passing through the outer circumferential part of the objective lens 240 has not yet been stopped down on the signal recording surface 51a. The adverse effect of the reflected beam part thereof is negligible.

Unlike the polarizing filter 31 previously described, the polarizing filter 310 may be substituted by a filter which can shade the outer circumferential part of the S polarized beam and the inner circumferential part of the P polarized beam. In other words, a filter which can transmit only the outer circumferential part of the P polarized beam, as indicated by the directional thin full lines with arrows at both ends in FIG. 6(c), and only the inner circumferential part of the S polarized beam, as indicated by the black dots in FIG. 6(c), may be used for this construction.

In such a construction, in reading out the SD of 0.6 mm, an optical super-resolution is generated to the P polarized beam whose inner circumferential part is shaded by the polarizing filter 310 and whose outer circumferential part passes through the polarizing filter 310 and is focused onto a signal recording surface 51a by the objective lens 240. Therefore, the diameter of the laser spot focused on the signal recording surface 51a can be further stopped down.

In each embodiment described above, the effect of the embodiments of the present invention is achieved by reducing the effective numerical aperture by transmitting one polarized beam and stopping down the other polarized beam through the polarization selection optical element. The effect of embodiments of the present invention, however, can also be achieved by reducing the effective numerical aperture by transmitting the laser beam of a certain wavelength and stopping down the laser beam of the other wavelength through a wavelength selection optical element.

In each embodiment described above, neither a laser beam of a 430 nm wavelength (a blue laser) nor a laser beam of a 532 nm wavelength (a green laser) is referred to. However, embodiments of the present invention are also realizable by using each of them.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are intended to be embraced therein.

We claim:

1. An optical disc readout apparatus comprising:

a first laser source for emitting a laser beam of plane-polarized light when a disc of first type is loaded;

second laser source for emitting a laser beam of plane-polarized light when a disc of second type different from the first type is loaded, the polarization plane of the laser beam emitted from the second laser source being orthogonal to the polarization plane of the laser beam emitted from the first laser source;

an optical system for guiding the laser beam emitted from either the first or the second laser source onto a signal recordind surface of a loaded optical disc and guiding a reflected laser beam therefrom onto a photo detector; and selective stopping down means for transmitting the laser beam emitted from the first laser source to focus onto the signal recording surface of the loaded optical disc without stopping down and for transmitting the laser beam emitted from the second laser source to focus onto the signal recording surface of the loaded optical disc with stopping down.

2. The optical disc readout apparatus according to claim 1, wherein the selective stopping down means is a partial polarizing filter which cuts the circumferential part of the laser beam emitted from the second laser source.

3. The optical disc readout apparatus according to claim 2, wherein the disc of the first type has shorter separation between the signal recording surface and the disc-surface than standard and the disc of the second type has standard separation between the signal recording surface and the disc-surface.

4. The optical disc readout apparatus according to claim 3, wherein the first laser source is a semiconductor laser and the second laser source is another semiconductor laser.

5. The optical disc readout apparatus according to claim 3, wherein the first laser source and the second laser source are formed on a common semiconductor laser chip and a selected laser source from among these laser sources outputs the laser beam.

6. The optical disc readout apparatus according to claim 1, wherein the selective stopping down means is a partial polarizing hologram which diffuses the circumferential part of the laser beam emitted from the second laser source.

7. The optical disc readout apparatus according to claim 6, wherein the disc of the first type has shorter separation between the signal recording surface and the disc-surface than standard and the disc of the second type has standard separation between the signal recording surface and the disc-surface.

8. The optical disc readout apparatus according to claim 7, wherein the first laser source is a semiconductor laser and the second laser source is another semiconductor laser.

9. The optical disc readout apparatus according to claim 7, wherein the first laser source and the second laser source are formed on a common semiconductor laser chip and a selected laser source from among these laser sources outputs the laser beam.

10. The optical disc readout apparatus according to claim 1, wherein the disc of the first type has shorter separation between the signal recording surface and the disc-surface than standard and the disc of the second type has standard separation between the signal recording surface and the disc-surface.

11. The optical disc readout apparatus according to claim 10, wherein the first laser source is a semiconductor laser and the second laser source is another semiconductor laser.

12. The optical disc readout apparatus according to claim 10, wherein the first laser source and the second laser source are formed on a common semiconductor laser chip and a selected laser source from among these laser sources outputs the laser beam.

13. An optical disc readout apparatus comprising:

a first laser source for emitting a laser beam of plane-polarized light when a disc of first type is loaded;

a second laser source for emitting the laser beam of plane-polarized light when a disc of second type different from the type is loaded, the polarization plane of the laser beam emitted from the second laser source being orthogonal to the polarization plane of the laser beam emitted from the first laser source;

an optical system for guiding the laser beam emitted from either the first or the second laser source onto a signal recording surface of a loaded optical disc and guiding a reflected laser beam therefrom onto either a first photo detector or a second photo detector;

selective stopping down means for transmitting the laser beam emitted from the first laser source to focus onto the signal recording surface of the loaded optical disc without stopping down and for transmitting the laser beam emitted from the second laser source to focus onto the signal recording surface of the loaded optical disc with stopping down; and controlling means for controlling the optical system to guide the reflected laser beam onto the first photo detector when a disc of the first type is loaded and to guide the reflected laser beam onto the second photo detector when a disc of the second type is loaded.

14. An optical disc readout apparatus comprising:

a first laser source for emitting a laser beam of plane-polarized light when a disc of first type is loaded;

a second laser source for emitting the laser beam of plane-polarized light when a disc of second type different from the first type is loaded, the polarization plane of the laser beam emitted from the second laser source being orthogonal to the polarization plane of the laser beam emitted from the second laser source;

an optical system for guiding a laser beam emitted from either the first or the second laser source onto a signal recording surface of a loaded optical disc and guiding a reflected laser beam therefrom onto either a first photo detector or on a second photo detector and a second photo detector;

selective stopping down means for transmitting the laser beam emitted from the first laser source to focus onto the signal recording surface of the loaded optical disc without stopping down and for transmitting a laser beam emitted from the second laser source to focus onto the signal recording surface of the loaded optical disc with stopping down; and switching means for sending the readout signal output from the first photo detector to a readout signal processing circuit when a disc of the first type is loaded and sending the readout signal output from the second photo detector to the readout signal processing circuit when a disc of the second type is loaded.

15. An optical disc readout apparatus comprising:

a first laser source for emitting a laser beam of plane-polarized light;

a second laser source for emitting the laser beam of plane-polarized light, the polarization plane of the laser beam emitted from the second laser source being orthogonal to the polarization plane of the laser beam emitted from the first laser source;

an optical system for guiding a laser beam emitted from either the first or the second laser source onto a signal recording surface of a loaded optical disc and guiding a reflected laser beam therefrom onto a photo detector;

selective stopping down means for transmitting the laser beam emitted from the first laser source to focus onto the signal recording surface of the loaded optical disc without stopping down and for transmitting the laser beam emitted from the second laser source to focus onto the signal recording surface of the loaded optical disc with stopping down; and driving means for driving the first laser source when a disc of first type is loaded and driving the second laser source when a disc of second type is loaded.

* * * * *